United States Patent
Nelson et al.

(10) Patent No.: US 9,902,898 B2
(45) Date of Patent: Feb. 27, 2018

(54) METHOD OF ENHANCING CONDUCTIVITY FROM POST FRAC CHANNEL FORMATION

(71) Applicant: Baker Hughes, a GE company, LLC, Houston, TX (US)

(72) Inventors: Scott Gregory Nelson, Cypress, TX (US); Ahmed M. Gomaa, Tomball, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/161,226

(22) Filed: May 21, 2016

(65) Prior Publication Data

US 2017/0335176 A1    Nov. 23, 2017

(51) Int. Cl.
*E21B 43/267* (2006.01)
*C09K 8/80* (2006.01)
*E21B 43/26* (2006.01)

(52) U.S. Cl.
CPC ............... *C09K 8/80* (2013.01); *E21B 43/26* (2013.01); *E21B 43/267* (2013.01); *C09K 2208/24* (2013.01); *C09K 2208/26* (2013.01)

(58) Field of Classification Search
CPC ....... E21B 43/267; E21B 43/261; C09K 8/80; C09K 8/68; C09K 8/805; C09K 2208/08
See application file for complete search history.

(56) References Cited

U.S. PATENT DOCUMENTS

| | | |
|---|---|---|
| 8,205,675 B2 | 7/2012 | Brannon et al. |
| 8,936,083 B2 | 1/2015 | Nguyen |
| 9,429,006 B2 | 8/2016 | Brannon et al. |
| 2008/0182761 A1 | 7/2008 | Stephenson et al. |
| 2012/0125617 A1 | 5/2012 | Gu et al. |
| 2014/0251626 A1 | 9/2014 | Gomaa et al. |
| 2014/0290943 A1 | 10/2014 | Ladva et al. |
| 2014/0299318 A1 | 10/2014 | Crews et al. |

(Continued)

FOREIGN PATENT DOCUMENTS

| | | |
|---|---|---|
| WO | 2012/170522 A2 | 12/2012 |
| WO | 2015/048021 A2 | 4/2015 |

OTHER PUBLICATIONS

Int'l Search Report and Written Opinion of the International Searching Authority; International Application No. PCT/US2017/030298, dated Aug. 9, 2017.

*Primary Examiner* — Zakiya W Bates
(74) *Attorney, Agent, or Firm* — John Wilson Jones; Jones Delflache LLP

(57) ABSTRACT

A method of enhancing conductivity within a hydrocarbon-bearing reservoir by building proppant pillars in a spatial arrangement in fractures created or enlarged in the reservoir. Two fluids of differing viscosity and stability are simultaneously pumped into the reservoir. The fluids contain identical proppants which include a proppant which is neutrally buoyant in the fluid and a proppant which is not neutrally buoyant in the fluid. Vertically extending pillars are created within the formation when the fluids are destabilized and the heavier proppant is then released from the destabilized fluids. The area between the pillars may be held open by the presence of the neutrally buoyant proppant in the remaining fluid. Fluid produced from the hydrocarbon-bearing reservoir is then flowed at least partially through channels between the vertically extending pillars.

20 Claims, 2 Drawing Sheets

(56) References Cited

U.S. PATENT DOCUMENTS

| | | | |
|---|---|---|---|
| 2015/0053403 A1* | 2/2015 | Potapenko | E21B 43/267 |
| | | | 166/280.2 |
| 2015/0075797 A1 | 3/2015 | Jiang et al. | |
| 2015/0083420 A1 | 3/2015 | Gupta et al. | |
| 2015/0232750 A1 | 8/2015 | Kanj et al. | |
| 2016/0340573 A1* | 11/2016 | Semenov | C09K 8/62 |
| 2017/0051599 A1 | 2/2017 | Bestaoui-Spurr et al. | |

* cited by examiner

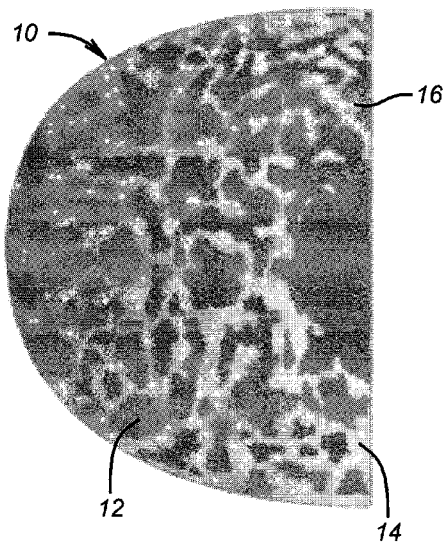
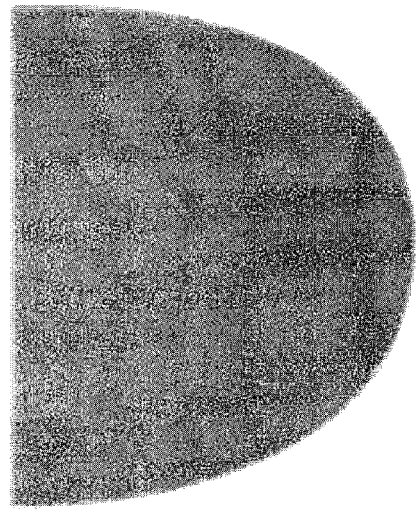
FIG. 1A  FIG. 1B
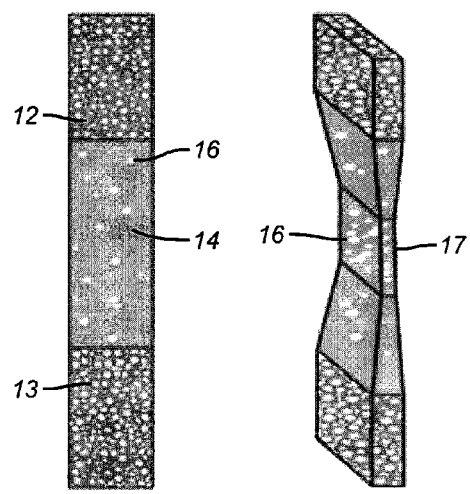
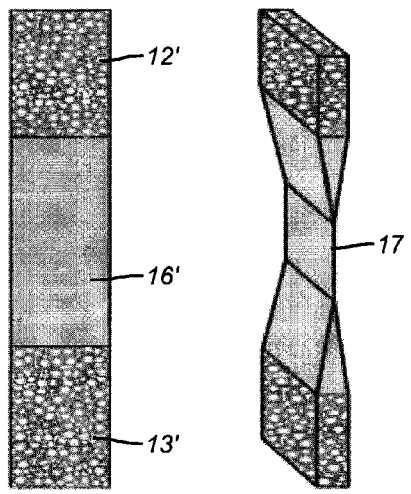
FIG. 2A  FIG. 2B  FIG. 2C  FIG. 2D

METHOD OF ENHANCING CONDUCTIVITY FROM POST FRAC CHANNEL FORMATION

FIELD OF THE DISCLOSURE

The disclosure relates to a method of enhancing conductivity within a subterranean formation by forming proppant pillars and creating flow channels in between the pillars.

BACKGROUND OF THE DISCLOSURE

During stimulation (such as hydraulic fracturing) of a subterranean reservoir, a fluid is pumped into the well which penetrates the reservoir at a pressure which is sufficient to create or enlarge a fracture within the reservoir. During fracturing, vertical fracture faces are held apart by the pumping of pressurized fluid. However, when the treatment ends and the hydraulic pressure is no longer present, the fracture opening closes under the influence of tectonic stresses.

Productivity of a hydraulic fracturing treatment operation is dependent on the effectiveness of the propping agent present in the fracturing fluid within conductive fractures. The proppant serves to prevent the fracture from closing and to hold the faces of the reservoir apart after the pumping treatment is completed and shut-down occurs. The proppant filled fracture increases the effective drainage radius of the wellbore and increases the producing rate of the well.

Pillar fracturing is a known method of creating proppant free channels in-situ wherein separate islands or "pillars" of proppant are created to hold open a fracture with open or conductive areas between the pillars. Proppant pillars formed in-situ conform to the shape and size of the fracture and unpropped areas as then highly conductive channels. Typically, pillar fracturing consists of pumping step-changed stages into a targeted production zone within the well wherein slugs of a clean fluid are followed by a fluid comprising a mixture of clean fluid and proppant. Conventional methods of alternating clean fluid and proppant laden fluid often result however in a gradual transition of clean fluid and proppant laden fluid rather than the desired sharp step-change.

Often conventional processes of pillar fracturing require the use of hindered settling aids, such as fibers, polymers, or surface bonding agents added to the proppant from within the carrier fluid in order to reinforce and consolidate the proppant in-situ and to inhibit settling of the proppant in the treatment fluid. Typically, the fibers added to both proppant-laden fluid and clean fluid aid to keep discrete proppant pillars intact while also filling the channels between the pillars to help hold the pillars in place. Thus, the fibers inhibit lateral expansion that would otherwise reduce the ultimate height of the pillar. Other processes require adhesive based materials as a settling aid to hold the proppant together in-situ while the fracture closes.

Alternative methods of pillar fracturing are desired. It is desired that such methods be capable of transporting proppant far into the targeted zone of the fracture with a minimum of settling and without requiring the use of hindered settling aids. In addition, alternative methods are desired for creating conductive channels in long fracture lengths which do not result in the transitioning of clean fluid and proppant laden fluid seen in step-change pillar fracturing. Such alternative pillar fracturing methods need to be less cumbersome and more predictable than the step-change fracturing methods presently practiced.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment, a method of enhancing the productivity of hydrocarbons from a hydrocarbon-bearing reservoir is provided where, subsequent to creating or enlarging one or more fractures within the subterranean formation, at least two proppant-laden slurries of varying viscosity and stability are simultaneously pumped into a well penetrating the formation. The viscosity ratio of the more viscous and stable slurry to the less viscous and less stable slurry is a minimum of 1.3:1. The proppant in each of the proppant-laden carrier slurries is the same. The proppant comprises a relatively lightweight proppant having an apparent specific gravity (ASG) less than or equal to 2.45 and a heavier proppant having an apparent specific gravity greater than or equal to 2.65. The less viscous slurry is degraded and the heavier proppant is released from the less viscous slurry. The released heavier proppant is then consolidated from the less viscous slurry in the fracture on an upper portion of the more stable slurry and/or at a pinch point in the width of the fracture. The released heavier proppant is then introduced into the width of the fracture. Two or more pillars are created within the fracture from the released heavier proppant. The more viscous slurry is then degraded and the heavier proppant is released from the more viscous slurry onto the created pillars. A channel is created in the subterranean formation between the pillars with the relatively lightweight proppant in the less viscous slurry and the more viscous slurry.

In another embodiment of the disclosure, a method of enhancing the productivity of hydrocarbons from a hydrocarbon-bearing reservoir is provided wherein, subsequent to the creation or enlargement of fractures within the reservoir, at least two proppant-laden slurries of differing viscosity and stability are simultaneously pumped into the well. The viscosity ratio of the more stable slurry to the less stable slurry is a minimum of 1.3:1. The viscosity ratio enables fingering effects to variably disperse the two slurries within the created or enlarged fracture. The proppant in each of the proppant-laden slurries is the same. Further, the proppant in each of the proppant-laden slurries includes a proppant neutrally buoyant in the fluid of the slurry and a heavier proppant having an apparent specific gravity greater than or equal to 2.45. The amount of neutrally buoyant proppant and heavier proppant in each of the proppant-laden slurries may be the same. The fluid of each of the proppant-laden slurries is also the same. The less viscous slurry is rendered less stable by the presence and/or amount of breaker, crosslinking agent, gel stabilizer, pH buffer or viscosifying agent. The difference in viscosity between the two slurries enables viscous fingering to variably disperse the slurries while they are being pumped. Following the pumping of the hydraulic fracture stimulation, the less viscous slurry is degraded first and vertically extending pillars are created within the formation from the proppant released from the less viscous slurry. The more viscous fluid is then degraded. The volume of proppant within the fracture is increased from the settling of the proppant from the more viscous slurry. A conductive channel is created between the pillars.

In another embodiment, a method of pillar fracturing a hydrocarbon-bearing reservoir is provided wherein, subsequent to the creation or enlargement of fractures within the subterranean formation, at least two slurries of differing viscosity are simultaneously pumped into the wells. Each of the slurries contains the same suspended proppant. The proppant is a mixture of proppant neutrally buoyant in the fluid of the slurry and a heavier proppant having an apparent specific gravity greater than or equal to 2.45. The amount of neutrally buoyant proppant and heavier proppant in each of the at least two proppant-laden slurries may be the same. The shape and/or placement of the proppant pillar to be created within the reservoir is controlled during the simultaneous pumping of the proppant-laden slurries while the proppant-laden slurries, i.e., while the slurries are in a dynamic state. The heavy proppant is first released from the suspension in the less viscous fluid while the less viscous fluid is in a static state. At least two vertically extending pillars are created within the formation from the heavy proppant released from the less viscous slurry. The heavy proppant suspended in the more viscous slurry is then released while the more viscous fluid is in a static state. The proppant released from the more viscous slurry further contributes to the building of the two vertically extending pillars. Conductive channels are created within the subterranean formation between vertically extending pillars. The fracture may be braced open between the pillars with the neutrally buoyant proppant from the more viscous and/or less viscous slurry.

In another embodiment of the disclosure, a method of increasing the conductivity of a fracture network within a subterranean formation penetrated by a well is provided. In this embodiment, after creating one or more fractures in the subterranean formation, two fluids of different viscosity are continuously and simultaneously introduced into the well. The two fluids have identical proppant and a carrier. The proppant comprises a proppant neutrally buoyant in each of the carrier fluids and a heavier proppant not neutrally buoyant in either of the carrier fluids. The less viscous fluid is less stable than the more viscous fluid. Proppant is released from the less viscous fluid and the proppant is allowed to settle within the formation. At least two pillars formed within the formation from the proppant released from the less viscous fluid. A partial monolayer of proppant is formed between the at least two pillars from the neutrally buoyant proppant in the carrier fluid of the more viscous fluid and the carrier fluid of the less viscous fluid. The partial monolayer inhibits fracture closure.

In another embodiment of the disclosure, a method of increasing the conductivity of a fracture network within a subterranean formation is provided wherein, subsequent to the creation or enlargement of a fracture, two fluids of different viscosity are continuously and simultaneously introduced into the well penetrating the formation. The two fluids are composed of a mixture of the same proppants which are suspended in a carrier. The carrier in each of the fluids is the same. The concentration of proppant in the two fluids may or may not be the same. One of the proppants in the mixture in each of the fluids is neutrally buoyant in the carrier of the fluid. A heavier proppant in each of the fluids is not neutrally buoyant in the carrier. The less viscous fluid is less stable than the more viscous fluid. The heavier proppant is released from the less viscous fluid first and falls due to gravitational forces within the created fracture until coming to rest on top of the more stable fluid positioned in the fracture and/or at a pinch point in the width of the fracture. At least two pillars are formed within the formation from the proppant released from the less viscous fluid as well as the proppant released from the more viscous fluid. A partial monolayer of proppant is formed between the pillars from the neutrally buoyant proppant in the more viscous fluid and the less viscous fluid.

In another embodiment of the disclosure, a method of enhancing the productivity of hydrocarbons from a hydrocarbon-bearing reservoir is provided. In this embodiment, after fractures are created or enlarged within the reservoir, at least two proppant-laden fluids of differing viscosity are simultaneously pumped into the reservoir. The proppant of each of the fluids is the same, the proppant comprising a proppant neutrally buoyant in the fluid and a heavier proppant having an apparent specific gravity greater than or equal to 2.45. The amount of neutrally buoyant proppant and heavier proppant in each of the proppant-laden fluids is the same. A placement pattern for the proppants in the fracture is established by viscous fingering of the two proppant-laden fluids of differing viscosity within the created or enlarged fracture. The well is then shut-in. Heavier proppant is then released from the less viscous fluid. The released heavier proppant from the less viscous slurry is then consolidated on an upper portion of the more stable fluid and/or at a pinch point in the width of the fracture. At least two vertically extending pillars are created within the reservoir from the proppant released from the less viscous fluid, the placement of the pillars being determined by the viscous fingering pattern developed by the two proppant-laden fluids. The more viscous fluid is then degraded and the heavier proppant is released. The heavier proppant released from the more viscous fluid adds to the proppant which has established the vertically extending pillars. Conductive channels are created within the reservoir between the vertically extending pillars. The fracture between the vertically extending pillars may be braced open with the neutrally buoyant proppant from the more stable and/or less stable fluid.

In another embodiment, a method of increasing the conductivity of a fracture network within a subterranean formation penetrated by a well is provided. In this embodiment, after the creation or enlargement of fractures within the subterranean formation, two proppant-laden fluids of differing viscosity are simultaneously pumped into the well. The more viscous fluid is more stable than the less viscous fluid. The fluid of each of the proppant-laden fluids is the same. The amount of proppant in each of the proppant-laden fluids is the same. The proppant in each of the proppant-laden fluids is the same. The proppant in each of the proppant-laden fluids contains a proppant neutrally buoyant in the fluid and a heavier proppant which is not neutrally buoyant in the fluid. The less viscous fluid is degraded and vertically extended pillars are created within the formation from proppant released from the less viscous fluid. The more viscous fluid is then degraded. The volume of the fracture is then filled with the proppant released from the more viscous fluid onto the pillars.

In another embodiment, a method of pillar fracturing a hydrocarbon-bearing subterranean formation penetrated by a well is provided. In this method, at least two slurries of differing viscosity are simultaneously introduced into the well subsequent to the creation or enlargement of fractures within the subterranean formation. Each of the slurries contains suspended proppant. The proppant in the slurries is the same and is a mixture of proppant neutrally buoyant in the fluid of the slurry and a heavier proppant having an apparent specific gravity greater than or equal to 2.45. The amount of neutrally buoyant proppant and heavier proppant in each of the at least two proppant-laden slurries is the same. The shape and/or placement of the proppant pillar to be created within the subterranean formation is controlled during the simultaneous pumping of the proppant-laden slurries while the proppant-laden slurries are in a dynamic state by fingering the proppant-laden slurries into the created or enlarged fractures. The heavy proppant is then released from the less viscous slurry while the less viscous slurry is in a static state. At least two vertically extended pillars are created within the subterranean formation from the heavy proppant released from the less viscous slurry. The heavy proppant suspended in the more viscous slurry is released while the more viscous slurry is in a static state. The vertically extended pillars are then built from the proppant released from the more viscous slurry. Conductive channels are created within the subterranean formation between the vertically extending pillars. The fracture between the vertically extended pillars may be braced open with the neutrally buoyant proppant from the more viscous and/or less viscous slurry.

In another embodiment, a method of increasing the conductivity of a fracture network within a subterranean formation penetrated by a well. In this method, subsequent to the creation or enlargement of fractures within the formation, two fluids of differing viscosity are continuously and simultaneously introduced into the well. The two fluids are composed of a carrier and a mixture of the same proppants. The proppants are suspended in the carrier. The carrier of each of the fluids is the same. One of the proppants in the mixture in each of the fluids is neutrally buoyant in the carrier and the heavier proppant in each of the fluids is not neutrally buoyant in the carrier, the less viscous fluid being less stable than the more viscous fluid. The heavier proppant is released from the less viscous fluid and travels to the top of the more stable fluid positioned in the fracture and/or at a pinch point in the width of the fracture. The traveling of the heavier proppant is due to gravitational forces within the created or enlarged fracture. At least two pillars are formed within the subterranean formation from the heavier proppant released from the less viscous fluid and the heavier proppant released from the more viscous fluid. A partial monolayer of proppant is created between the pillars from the neutrally buoyant proppant in the more viscous fluid and the less viscous fluid.

In another embodiment, a method of increasing the conductivity of a fracture network within a subterranean formation penetrated by a well is provided. In this embodiment, after creating one or more fractures in the formation, two fluids of different viscosity are continuously and simultaneously pumped into the well. The two fluids contain a carrier and identical proppant. The proppant is a mixture of a proppant neutrally buoyant in the carrier of the fluid and a heavier proppant not neutrally buoyant in the carrier of the fluid. The less viscous fluid is less stable than the more viscous fluid. Proppant is released from the less viscous fluid and the proppant then settles within the formation. At least two pillars are formed within the formation from the proppant released from the less viscous fluid and from proppant released from the more viscous fluid. A partial monolayer of proppant between pillars may be formed from the neutrally buoyant proppant which may remain suspended in the carrier of the more viscous fluid as well as neutrally buoyant proppant which may remain suspended in the carrier of the less viscous fluid. The partial monolayer inhibits closure of the fracture.

In another embodiment of the disclosure, a method of increasing the conductivity of a fracture network within a formation is provided wherein, subsequent to a hydraulic fracturing operation, two aqueous proppant-laden slurries having identical proppant are continuously and simultaneously pumped into a well penetrating the formation. The concentration of proppant in the two aqueous proppant-laden slurries may or may not be the same. The proppant in each of the slurries contains a mixture of proppant neutrally buoyant in the fluid of the slurry and a heavier proppant not neutrally buoyant in the fluid of the slurry. One of the slurries is less viscous and less stable than the other. The heavier proppant is released from the less stable slurry first after completion of the pumping of fluids into the well but while the created or extended fractures initiated during the hydraulic fracturing operation are open and while the less stable slurry and more stable slurry are both in a static state. At least two pillars are formed within the formation from the heavy proppant released from the less stable slurry and the heavy proppant released from the more stable slurry. A conductive channel is created between the pillars. The conductive channel is maintained between the pillars with the neutrally buoyant proppant which remains in the more stable and the less stable slurries.

In another embodiment of the disclosure, a method of increasing the conductivity of a fracture network within a subterranean formation penetrated by a well is provided. In this embodiment, two aqueous proppant-laden slurries of differing viscosity are simultaneously pumped into the well after the formation has been subjected to a hydraulic fracturing operation. The more viscous slurry is more stable than the less viscous slurry. The fluid of each of the proppant-laden slurries is the same. The proppant in each of the proppant-laden slurries is the same and comprises a mixture of a relatively lightweight proppant in the fluid of the slurry (preferably neutrally buoyant in the fluid of the slurry) and a heavier proppant which is not neutrally buoyant in the fluid of the slurry. The less viscous slurry is degraded and vertically extending pillars are created within the formation from proppant released from the less viscous slurry. The more viscous fluid is then degraded and the heavy proppant of the more viscous fluid falls from suspension and fills the volume of the fracture onto the pillars. A partial monolayer of proppant may be created from the relatively lightweight proppant in areas between the pillars.

DESCRIPTION OF DRAWINGS

The following figures are part of the present specification, included to demonstrate certain aspects of various embodiments of this disclosure and referenced in the detailed description herein.

FIG. 1A depicts a cross-sectional view of a fracture, after closure, illustrating conductive flow channels between pillars created by the method disclosed herein performed after a conventional fracturing treatment. FIG. 1B depicts a cross sectional view of a fracture, after closure, illustrating a conventional fracturing treatment that does not include the treatment operation disclosed herein.

FIG. 2A and FIG. 2B depict a top view and side view, respectively, of a fracture, after closure, illustrating conductive flow channels between pillars created by the pillar fracturing method disclosed herein. FIG. 2C and FIG. 2D depict a top view and a side view, respectively, of a fracture, after closure, illustrating a conventional pillar fracturing method.

DETAILED DESCRIPTION

Figure 3:
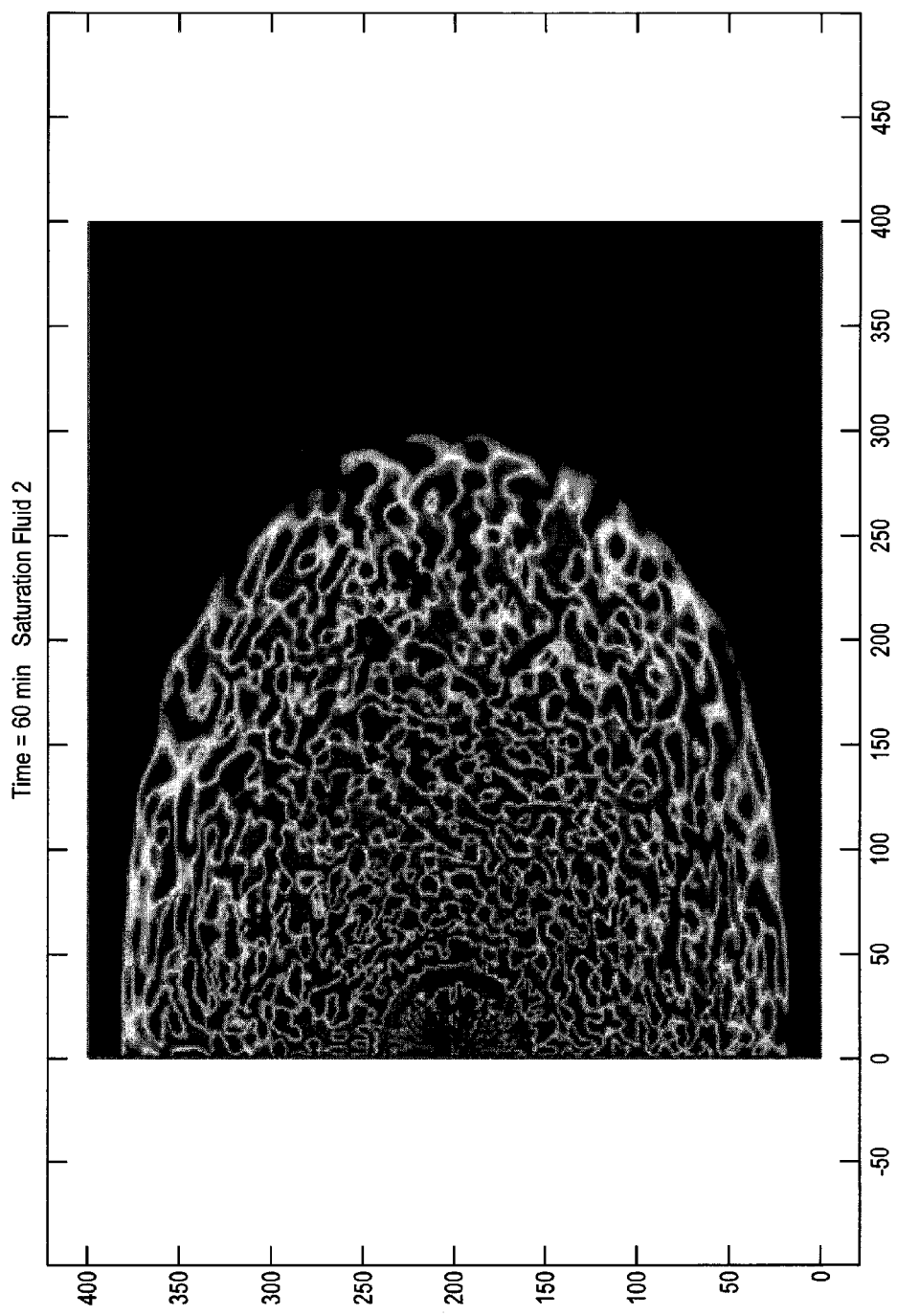
FIG. 3 is a two dimensional depiction of a fracture, after closure of the fracture, and after the simultaneous pumping of two slurries containing a mixture of relatively lightweight and heavier proppants.

Illustrative embodiments of the invention are described below as they might be employed in the operation and treatment of a fracturing operation. In the interest of clarity, not all features of an actual implementation are described in this specification. It will of course be appreciated that in the development of any such actual embodiment, numerous implementation and/or specific decisions must be made to achieve the specific goals of the operator, which will vary from one implementation to another. Moreover, it will be appreciated that such a development effort might be complex and time-consuming, but may nevertheless be a routine undertaking for those of ordinary skill in the art having the benefit of this disclosure. Further aspects and advantages of the various embodiments of the invention will become apparent from consideration of the following description.

Certain terms are used herein and in the appended claims to refer to particular stages. As one skilled in the art will appreciate, different persons may refer to a stage and the components of a stage by different names. This document does not intend to distinguish between components that differ or stages in name but not function. Also, the terms "including" and "comprising" are used herein and in the appended claims in an open-ended fashion, and thus should be interpreted to mean "including, but not limited to . . . ." Further, reference herein and in the appended claims to aspects in a singular tense does not necessarily limit the present disclosure or appended claims to only one such aspect, but should be interpreted generally to mean one or more, as may be suitable and desirable in each particular instance.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

The disclosure relates to a method of distributing proppant in a spatial arrangement within a created or enlarged fracture. The formation may first be propagated by introducing into the formation a fluid at a pressure sufficient to create, enlarge or propagate the fracture. Such fracturing operations include conventional fracturing operations wherein a long primary bi-wing fracture is first created perpendicular to the minimum stress orientation and wherein pumping of fracturing fluid into the wellbore extends the planar or primary fracture while limiting extensions of secondary fractures near the wellbore. Further, the formation may be first propagated in a slickwater fracturing operation. Such stimulation operations are more characteristic in the treatment of low permeability formations, including tight gas reservoirs, such as shale formations. The fracturing operation may further be an operation typically used to enhance the complexity of a fracture network especially for increasing the productivity of hydrocarbons far field from the wellbore as well as near wellbore. Such operations do are distinct from the traditional bi-wing fracturing operations.

See, for instance, U.S. Pat. No. 8,371,383; U.S. Pat. No. 9,194,223; U.S. Patent Publication No. 2014/00143381; U.S. Patent Publication No. 2013/0341030; and U.S. Patent Publication No. 2014/0299318, all of which are herein incorporated by reference.

The stage, which initiates the fracture, may include any conventional proppant, including any of the proppants defined in this disclosure. In some instances, it is desirable to pump into the formation an acid in order to etch the surface of the formation prior to subjecting the formation to pillar fracturing.

After the creation of a fracture or enlargement of an existing fracture in the subterranean reservoir, a mixture of two slurries are pumped into the formation. The slurries are preferably pumped into the formation simultaneously. The two slurries pumped into the formation differ in viscosity and stability. The slurries are typically continuously pumped; the stability of one of the stages being changed at a pulse rate from about 15 seconds to about 5 minutes.

The fluid of the slurry may be any carrier fluid suitable for transporting a mixture of proppant into a formation fracture in a subterranean well. Such fluids include, but are not limited to, salt water, fresh water, liquid hydrocarbons, natural gas, foam, carbon dioxide, nitrogen or other gases.

Both of the slurries pumped into the formation contain a mixture of the same proppants. In a preferred embodiment, the concentration of proppants in the mixture of each of the slurries is the same. The proppant mixture consists of one proppant having a lower density than the other. Typically, the proppant mixture contains only two proppants of varying density though a mixture of proppants of varying density could be used as well.

In a preferred embodiment, one of the proppants is a relatively lightweight proppant. The term "relatively lightweight" as used herein shall refer to a particulate that has an apparent specific gravity (ASG) (API RP 60) that is substantially less than a conventional particulate material employed in hydraulic fracturing or sand control operations, e.g., sand (having an ASG, API RP 60, of 2.65) or an ASG similar to these materials.

In a preferred embodiment, the term "relatively lightweight" shall include ultra lightweight (ULW) density proppants having an ASG less than 2.65, preferably less than or equal to 2.45, more preferably less than or equal to 2.25, even more preferably less than or equal to 2.0, and more preferably less than or equal to 1.75, most preferably less than or equal to 1.25 and often less than or equal to 1.05. The lightweight proppant may constitute a mixture of relatively lightweight proppants.

The relatively lightweight proppant is preferably capable of being suspended in the fluid of the slurry. In a preferred embodiment, the proppant of lower ASG in the slurry is substantially neutrally buoyant in the fluid of the slurry. The term "substantially neutrally buoyant" as used herein shall refer to a relatively lightweight particulate that has an ASG sufficiently close to the ASG of the viscous fluid which allows pumping and satisfactory placement of the proppant/particulate using the selected ungelled or weakly gelled carrier fluid. For example, urethane resin-coated ground walnut hulls having an ASG of from about 1.25 to about 1.35 may be employed as a substantially neutrally buoyant proppant/particulate in completion brine having an ASG of about 1.2.

Exemplary lightweight proppants include resin coated ceramic proppants or a synthetic organic particle such as polyamides, polystyrene-divinylbenzene beads, nylon pellets, ceramics, etc. Suitable proppants further include those set forth in U.S. Pat. Nos. 7,494,711; 7,713,918 and 7,931,087, herein incorporated by reference. The proppant may be a plastic or a plastic composite such as a thermoplastic or thermoplastic composite or a resin or an aggregate containing a binder, including plastic beads. Other suitable relatively lightweight proppants are those particulates disclosed in U.S. Pat. Nos. 6,364,018, 6,330,916 and 6,059,034, all of which are herein incorporated by reference. These may be exemplified by ground or crushed shells of nuts (pecan, almond, ivory nut, brazil nut, macadamia nut, etc); ground or crushed seed shells (including fruit pits) of seeds of fruits such as plum, peach, cherry, apricot, etc.; ground or crushed seed shells of other plants such as maize (e.g. corn cobs or corn kernels), etc.; processed wood materials such as those derived from woods such as oak, hickory, walnut, poplar, mahogany, etc. including such woods that have been processed by grinding, chipping, or other form of particalization. Preferred are ground or crushed walnut shell materials coated with a resin to substantially protect and water proof the shell. Such materials may have an ASG of from about 1.25 to about 1.35.

Further use of a lightweight proppant is a cashew nutshell liquid (CNSL), a natural, non-food chain, and annually renewable biomaterial. Cashew nutshell liquid exhibits ultra high closure stress capability and typically has an apparent specific gravity around 1.05.

The ASG of the heavier proppant is preferably greater than or equal to 2.65 and is typically a conventional proppant, such as sand, quartz, ceramic, silica, glass and bauxite. The heavier proppant may be a mixture of heavier proppants.

The size of the proppants in the proppant mixture will depend on the fracture widths for the particular lithology that is being subjected to treatment. In some cases, the proppants may be less than 1 mm but larger than 10 microns in size.

Typically, the amount of proppant in each of the slurries is between from about 1 to about 10, more typically between from about 3 to about 6, pounds per gallon. The ratio between relatively lightweight proppant to heavier proppant in each of the slurries is typically between from about 1:100, more typically between from about 1:50 to about 1:3 [or 0.1 to 10, 5 and 3 per gallon (ppg) relatively lightweight proppant to heavy proppant, respectively].

The pumping of slurries of different viscosity and stability enable the formation of multiple irregular-shaped proppant beds or pillars at periodic points of support within the created or enlarged fracture. Such pillars hold the fracture faces of the formation apart, thereby enhancing the conductivity of the fracture. The pillars are periodically distributed over the fracture surface and are capable of supporting closure load. The support provided by the pillars keeps the fracture faces from touching one another. This bed pattern may be repeated across the fracture height. The proppant beds are permeable, as in a conventional proppant distribution but, in addition, the open fracture between beds has a flow capacity many times greater than that of the beds.

The slurries pumped simultaneously into the well exhibit different viscosities. The more viscous slurry is typically at least 1.3 times, more typically at least 1.5 times, the viscosity of the less viscous slurry. Typically, the viscosity ratio of the more viscous to less viscous slurry is less than 10:1, preferably less than 5:1, more preferably about 2:1. In some embodiment, the viscosity ratio may be as high as 50:1. Typically, the less viscous fluid will be greater than 100 cP and the more viscous fluid less than 2,000 cP viscosity, more preferably the less viscous fluid will be greater than 200 cP and the more viscous fluid less than 1,000 cP viscosity (viscosities herein measured using a Fann 50C Rheometer or equivalent using procedures as defined in API RP 13M).

The viscosity ratio of the two fluids is typically maintained during the pumping of fluids into the well (the dynamic state). The fluids being simultaneously and continuously pumped into the well are determinative of the shape of the proppant pillar and the placement of the proppant pillar within the formation, i.e., the placement and shape of the proppant pillars are determined when the fluids are in a dynamic state. The actual creation of the pillars in-situ within the reservoir occur when the slurry is in a static state, i.e., after completion of the pumping of fluids into the reservoir.

The slurry which is more viscous exhibits greater stability than the slurry of lower viscosity. Since the more viscous fluid exhibits greater stability, the time for degradation of the slurry (the break time) of the more viscous fluid is longer than the time for degradation of the slurry of the less viscous fluid. The proppant will therefore fall from the less viscous fluid before the proppant in the more viscous fluid is released.

As the gelation within the less viscous fluid decreases and as the less viscous slurry degrades, the heavier suspended proppant is released from the slurry. The released proppant will accumulate on an upper portion of the more stable slurry in the fracture or in a pinch point in the fracture width to start the building of the pillar. Thus, proppant released from the slurries are impeded and stack up to form the pillars. Any amount of fracture width reduction relating to fracture closure may apply pressure on the sides of the pillar. This may act to confine and lock the pillar into place within the fracture.

Viscous fingering of the fluids when pumped promotes the building of the irregular shaped and diffused pillar pattern in the fracture. The amount and extent of the viscous fingering and the flow path during viscous fingering may be dependent on the viscosity ratio between the more viscous fluid and the less viscous fluid pumped into the well, characteristics of the fracture, characteristics of the formation being treated and dimensions of the fracture, as determined through modeling. Placement of the pillars within the fracture is at least partially determined by the flow path of the more viscous and less viscous fluids during viscous fingering within the fracture. Creation of the flow path may be dependent on pulse rate.

The formation of the pillar does not require the presence of hindered settling aids in either the more viscous fluid or less viscous fluid.

Further growth of the pillars occurs upon release of the heavier proppant from the more viscous slurry. This occurs as the stability of the more viscous slurry decreases. As the heavier proppant is released from the more viscous slurry, the conductive channel created during the settling of the heavy proppant is propped open by the pillars. The length of the conductive channel in the formation remains extended.

While a portion of the lightweight proppant may fall with the heavier proppant from suspension, the lightweight proppant, being preferably neutrally buoyant in the fluid of the slurry, remains relatively suspended in the fluid of the two slurries (formerly defined as the more viscous and less viscous slurries). Fracture conductivity between the pillars may be enhanced by keeping the area between the pillars opened by bracing any areas of possible fracture closure with the neutrally buoyant proppant.

FIG. 1A is a cross-sectional view of a pillared fracture network 10 formed by the pillar fracturing method disclosed herein. FIG. 1A is contrasted with FIG. 1B which demonstrates the pathways resulting from propagation of the fractures and prior to the formation of the pillared fracture network. Referring to FIG. 1A, pillars 12 are formed within the formation from the proppant bed. Conductive channels 14 provide the pathway for hydrocarbons to be recovered from the formation. The lightweight proppant 16 is shown as being within the conductive channel during recovery of the hydrocarbons. The pillared network is formed after completion of propagation of the fracture which results from the hydraulic fracturing operation.

FIG. 2A is a top view showing the formation of proppant pillars 12 and 13 which hold the surfaces of the fracture apart. Proppant pillars 12 and 13 are shown as defining a proppant bed composed of the heavy proppant from the more viscous slurry as well as the less viscous slurry in the form of the vertically extending pillars. Conductive flow channel 14 between proppant pillars 12 and 13 allow for the flow of produced fluid between the spaced pillars. In addition, produced fluid may flow through proppant pillars 12 and 13 when the proppant is in contact with and adjacent to a producing reservoir. Fluid containing suspended lightweight proppant 16 neutrally buoyant in the fluid flows unhindered within conductive channel 14. The fluid in which lightweight proppant 16 is suspended is the fluid remaining after degradation of the more viscous slurry and the less viscous slurry. FIG. 2B, a side view, shows lightweight proppant 16 holding the fracture open at 17 to enhance the pathway of the conductive channel between the pillars. The formation of a partial monolayer of proppant at 17 braces the fracture against closure and thus ensures a complete flow of hydrocarbons through the channels and toward the wellbore. The buoyant lightweight proppant suspended in the fluid which is not confined during fracture closure in a partial monolayer concentration is free to flow unbounded in the reservoir. The flow of unconfined relatively lightweight proppants leaves the created channels open as paths for hydrocarbons and reservoir fluid production. Typically, the relatively lightweight proppants will move in the direction of the fluid flow within the reservoir toward the wellbore until they encounter a resistance or meet the point where the proppant around the wellbore is positioned.

Any closure of the formation between the pillars that takes place within the created channels will be held open and remain conductive by the relatively lightweight proppant bracing the fracture walls apart. The relatively lightweight proppant thus prevents the full closure of the facture, thereby maintaining fracture conductivity.

FIG. 2C and FIG. 2D depict a top view and a side view, respectively, of a fracture, after closure, illustrating a conventional pillar fracturing method. As illustrated, the opening of conductive flow channel 16' is sustained by pillars 12' and 13'. However, when pillars 12' and 13' are too distant from each other and/or unable to provide the support to hold the fracture open, the formation faces touch each other and the fracture may close at 17'. The portion of the fracture surface area that closes severely curtails production from the reservoir. This is in contrast to the conductive flow channel of FIG. 2B which remains open at 17 by the presence of the lightweight proppant suspended in the fluid within the channel.

The pattern for placement of the pillars and subsequent channel creation of the pillars is determined through computational fluid dynamic models known in the art. Examples of suitable models include, but are not limited to, "MFRAC" employed by Baker Hughes Incorporated and available from Meyer and Associates of Natrona Heights, Pa.; "FRACPRO" from Resources Engineering Services; and "FRACPRO PT", available from Pinnacle Technology.

FIG. 3 illustrates the intermingling of the mixture of the two fluids of differing viscosity within the fracture over 60 minutes, wherein the x-axis is fracture length (in feet) progressing away from a wellbore located to the far left side. The y-axis is fracture height (in feet). The difference in viscosity of the fluids promotes the viscous fingering of the fluids while in motion and within the fracture. As illustrated, the two fluids are variably dispersed within the fracture. The viscosity ratio of the more stable fluid to the less stable fluid enables the viscous fingering of the two fluids and the resulting variable fluid dispersement in the hydraulic fracture. When the viscosity ratio of the two fluids is sufficiently large, and the volumes of the two simultaneously pumped fluids are optimized, the variably in the created dispersed fluid pattern results in a pillar and channel network within the fracture that facilitates enhanced fracture conductivity.

Each of the viscous fluids, in addition to containing a mixture of the referenced proppants, may contain one or more agents known to enhance or weaken the stability of proppant laden slurry. (As used herein the term, "proppant laden slurry" or "proppant laden fluid" shall refer to a slurry or a fluid containing a proppant.) Such agents include viscosifying agents, crosslinking agents, gel stabilizers, breakers, pH control agents, etc.

Typically, each of the fluids is gelled by the inclusion of a conventional viscosifying agent, such as a viscosifying polymer or viscoelastic fluid. The fluid may further contain a conventional crosslinking agent to enhance the desired viscosity of the fluid. For instance, the viscosity of the more viscous fluid may be greater than or equal to 600 cP at formation temperature while the viscosity of the less viscous fluid may be less than 300 cP at formation temperature.

Typically, any or all of the viscosifying agents, crosslinking agents, gel stabilizers, breakers, pH control agents, etc. in the two slurries may be the same. For instance, both of the slurries may contain (a) the same viscosifying agent and crosslinking agent; (b) the same gel stabilizer and breaker; (c) the same viscosifying agent, crosslinking agent, gel stabilizer and breaker, etc. The selection of any of these materials as well as the amount of such materials are used to control the viscous nature and the stability of the fluids. Unlike methods conventionally employed, the pillar fracturing defined herein uses the same proppant in each of the stages. While the amount of proppant may be varied in between pulsed stages, the proppant mixture is pumped in each of the pulsed stages at a constant rate. The stability of the proppant slurries is governed by materials in the pumped slurries other than the proppant.

For instance, the stability of the fluid may be modified by varying the amount (or presence) of the gel stabilizer. As an example, the gel stabilizer may be present in the more stable fluid but not in the less stable fluid or a more effective amount for gel stabilization may be present in the more viscous/more stable fluid than the less viscous/less stable fluid.

As another alternative, each of the fluids may contain different viscosity and/or stability controlling materials. For instance, the viscosifying agent(s), crosslinking agent(s), gel stabilizer(s), breaker(s) and/or pH buffer(s) in one fluid may be different from the viscosifying agent(s), crosslinking agent(s), gel stabilizer(s), breaker(s) and/or pH buffer(s) in the other fluid. As an example, the less stable fluid may contain a less effective gel stabilizer loading than the gel stabilizer loading applied to the more stable fluid.

As another example, the loading of the breaker in the more stable fluid may be less than the loading of breaker in the less stable fluid. Thus, the less stable fluid will be programmed to break earlier than the more stable fluid due to the presence of the amount of breaker in the less stable fluid.

In another alternative, the loading of gel stabilizer, crosslinking agent or viscosifying agent in the more viscous/more stable fluid may be greater than the loading of gel stabilizer, crosslinker or viscosifying agent in the less viscous/less stable fluid.

Alternatively, or in addition to varying the loading of gel stabilizer, crosslinker or viscosifying agent, a less stable fluid may be differentiated from a more stable fluid by varying the pH of the fluid. As an example, the stability of a fluid may be enhanced by buffering the pH of the fluid to a pH which is less than optimum for degradation of the crosslinked fluid by the breaker. Since the pH of the fluid is less than optimum for the selected breaker to break the gellant of the slurry, the slurry would exhibit greater stability (greater difficulty in breaking) than the fluid containing the optimal pH for the breaker to effectively destabilize the gellant.

As another example, the concentration of breaker in the more stable fluid may be less than optimum for breakage of the viscous fluid by the selected breaker. Degradation of the crosslinked fluid with the lower amount of breaker may take longer than degradation of the crosslinked fluid having a higher amount of breaker.

Thus, the fluid being pulsed in each of the stages is the same except for the stability controlling material. In other words, at each pulse the fluid is either stabilized or destabilized by changing the viscosifying agent(s), crosslinking agent(s), gel stabilizer(s), breaker(s) and/or pH buffer(s) or the amount of such materials. Thus, the viscosity and stability of the slurry is varied without changing the proppant and the concentration of proppant in the fluid. As such, it is not necessary for the operator to turn on and off the proppant as required in step-changed pillar fracturing.

The requisite pattern for pillar placement as determined through modeling may make it desirable to vary the viscosity and stability of one of the fluids in order to promote viscous fingering of the two fluids during pumping while in dynamic motion within the fracture. Typically, the stability of the less viscous fluid is varied at a pulse rate between from about 15 seconds to about 5 minutes, more typically from about 30 seconds to 2 minutes; the pulse rate being entirely dependent on formation, wellbore, and hydraulic fracturing parameters.

The stability of the less viscous fluid may be changed between pulsing in order to provide the requisite pillar formation as determined by computer modeling.

As an example, a fracture may be simulated using the Mfrac three-dimensional hydraulic fracturing simulator of Meyer & Associates, Inc. using a simple 3-layer isotropic homogeneous reservoir model, 40 acre spacing. The fracture may then be designed to be placed into the zone at a theoretical depth of 15,000 feet. The modeling would provide the approximate amount of proppant and the desirable pumped slurry rate as well as the rate of pumping for the proppant mixture into the reservoir for any fracture height or width. After pumping of conventional proppant into the formation, the two fluids of varying viscosity may be pumped simultaneously into the formation. The differential in viscosity between the two fluids may vary as, for example, between 200 to about 1500 cP, at times between from about 400 to about 800 cP. During each fluid pulse, the stability of the lower viscosity fluid may be changed by altering the (i) identity or amount of breaker; (ii) the gel stabilizer or the amount of gel stabilizer; (iii) the loading of the crosslinking agent or any combination thereof. The variance in the viscosity of the fluid causes the two fluids to move in conjunction with each other; the lower viscosity fluid moving faster and viscous fingering the higher viscosity fluid to create the pillar pattern.

The stability of the fluid may be changed repeatedly during successive pulsing such that the stability of the less viscous fluid in the third pulsed stage may be more stable than the less viscous fluid in the second pulsed stage; the stability of the less viscous fluid in the fourth stage may be less stable than in the third stage, etc. Upon completion of the pulsing and prior to closure stress, the pillars are created.

Pillar fracturing as disclosed herein may be used in the treatment of conventional rock formations such as carbonate formations (like limestone, chalk and dolomite), sandstone or siliceous substrate minerals, such as quartz, clay, shale, silt, chert, zeolite, or a combination thereof. The method has further applicability in the treatment of unconventional low permeability hydrocarbon reservoir formations, such as shale, tight sandstone and coal bed methane wells including those having a permeability less than or equal to 10 mD and most especially those subterranean reservoirs having a permeability less than or equal to 1 mD. The method is especially suitable for use in deep, highly stressed wells where proppants have insufficient strength to withstand loads without crushing.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of enhancing the productivity of hydrocarbons from a hydrocarbon-bearing formation which comprises:
   (A) subsequent to creating or enlarging one or more fractures within the subterranean formation, simultaneously pumping into a well penetrating the hydrocarbon-bearing formation at least two proppant-laden slurries of different viscosity and stability wherein one of the slurries is more viscous and more stable than another of the slurries which is less viscous and less stable, wherein the viscosity ratio of the more viscous slurry to the less viscous slurry is a minimum of 1.3:1 and further wherein the proppant in each of the proppant-laden slurries is the same, the proppant comprising a relatively lightweight proppant and a heavier proppant having an apparent specific gravity greater than or equal to 2.65;
   (B) degrading the less viscous slurry and releasing the heavier proppant from the less viscous slurry;
   (C) consolidating the released heavier proppant from the less viscous slurry on an upper portion of the more viscous slurry and/or at a pinch point in the width of the fracture;

(D) introducing the released heavier proppant from the less viscous slurry into the width of the fracture and creating two or more pillars within the fracture from the released heavier proppant;
(E) degrading the more viscous slurry and releasing the heavier proppant from the more viscous slurry onto the created two or more pillars; and
(F) creating a channel in the subterranean formation between the two or more pillars with the relatively lightweight proppant in the less viscous slurry and the more viscous slurry.

2. The method of claim 1, further comprising creating a partial monolayer between the two or more pillars with the relatively lightweight proppant.

3. The method of claim 1, further comprising maintaining fracture conductivity between the at least two pillars by bracing the area between the at least two pillars with the relatively lightweight proppant.

4. The method of claim 1, further comprising repeating altering the stability of the less viscous and less stable slurry and repeating step (A), wherein the stability of the less viscous and less stable slurry is changed by varying the breaker, crosslinking agent, gel stabilizer, viscosifying agent or pH buffer or a combination thereof.

5. The method of claim 4, wherein at least one of the following conditions prevail:
(a) each of the at least two proppant-laden slurries contains the same breaker;
(b) each of the at least two proppant-laden slurries contains the same crosslinking agent;
(c) each of the at least two proppant-laden slurries contains the same gel stabilizer;
(d) each of the at least two proppant-laden slurries contains the same viscosifying agent; or
(e) the pH of the at least two proppant-laden slurries is the same.

6. The method of claim 1, further comprising repeating altering the stability of the less viscous and less stable slurry and repeating step (A), wherein the stability of the less viscous and less stable slurry is changed by varying the quantity of breaker, crosslinking agent, gel stabilizer, viscosifying agent or pH buffer or a combination thereof.

7. The method of claim 6, wherein at least one of the following conditions prevail:
(a) each of the at least two proppant-laden slurries contains the same breaker;
(b) each of the at least two proppant-laden slurries contains the same crosslinking agent;
(c) each of the at least two proppant-laden slurries contains the same gel stabilizer;
(d) each of the at least two proppant-laden slurries contains the same viscosifying agent; or
(e) the pH of the at least two proppant-laden slurries is the same.

8. The method of claim 1, wherein the amount of proppant in the two proppant-laden slurries is the same.

9. A method of pillar fracturing a hydrocarbon-bearing subterranean formation penetrated by a well, the method comprising:
(A) after the creation or enlargement of fractures within the subterranean formation, simultaneously pumping into a well penetrating the hydrocarbon-bearing reservoir at least two proppant-laden fluids of differing viscosity, wherein the proppant of each of the at least two proppant-laden fluids is the same, the proppant comprising a proppant neutrally buoyant in the fluid and a heavier proppant having an apparent specific gravity greater than or equal to 2.45, wherein the amount of neutrally buoyant proppant and heavier proppant in each of the at least two proppant-laden carrier fluids is the same;
(B) viscous fingering the two proppant-laden fluids of differing viscosity within the created or enlarged fracture and developing a placement pattern for the heavier proppants of the less viscous fluid and the more viscous fluid in the fracture;
(C) shutting in the well;
(D) releasing the heavier proppant from the less viscous fluid;
(E) consolidating the released heavier proppant from the less viscous fluid on an upper portion of the more stable fluid and/or at a pinch point in the width of the fracture;
(F) creating at least two vertically extending pillars within the formation from the heavier proppant released from the less viscous fluid wherein the placement of the at least two vertically extending pillars is determined by the viscous fingering pattern of the two proppant-laden fluids of step (B);
(G) degrading the more viscous fluid and building at least two vertically extending pillars from the heavier proppant released from the more viscous fluid;
(H) creating conductive channels within the subterranean formation between the at least two vertically extending pillars; and
(I) bracing open the fracture between the at least two vertically extending pillars with the neutrally buoyant proppant from the more stable and/or less stable fluid.

10. The method of claim 9, further comprising creating a partial monolayer between the at least two vertically extending pillars with the neutrally buoyant proppant.

11. The method of claim 9, further comprising repeating step (A) at a pulse rate between from about 15 seconds to about 5 minutes.

12. The method of claim 9, wherein the difference in viscosity between the more viscous fluid and the less viscous fluid is between from 200 to 1500 cP.

13. The method of claim 9, wherein at least one of the following conditions prevail:
(a) the more viscous fluid and the less viscous fluid contain the same breaker and further wherein the amount of breaker in the less viscous fluid is more than the amount of breaker in the more viscous fluid; or
(b) the more viscous fluid and the less viscous fluid contain the same gel stabilizer and further wherein the amount of gel stabilizer in the less viscous fluid is less than the amount of gel stabilizer in the more viscous fluid.

14. The method of 9, wherein at least one of the following conditions prevail:
(a) the less viscous fluid is less stable than the more viscous fluid by the amount of pH buffer present in the less viscous fluid; or
(b) the more viscous fluid and the less viscous fluid contain the same viscosifying agent and wherein the amount of viscosifying agent in the less viscous fluid is less than the amount of viscosifying agent in the more viscous fluid.

15. A method of pillar fracturing a hydrocarbon-bearing subterranean formation penetrated by a well, the method comprising:
(A) subsequent to the creation or enlargement of fractures within the subterranean formation, pumping at least two slurries of differing viscosity simultaneously into the wells, wherein each of the slurries contains suspended proppant and wherein the proppant in the at least two slurries is the same and is a mixture of proppant neutrally buoyant in the fluid of the slurry and a heavier proppant having an apparent specific gravity greater than or equal to 2.45 and further wherein the amount of neutrally buoyant proppant and heavier proppant in each of the at least two proppant-laden slurries is the same;

(B) controlling the shape and/or placement of a proppant pillar to be created within the subterranean formation during the simultaneous pumping of the proppant-laden slurries while the proppant-laden slurries are in a dynamic state by fingering the proppant-laden slurries into the created or enlarged fractures;

(C) releasing the heavy proppant from the less viscous slurry while the less viscous slurry is in a static state;

(D) creating at least two vertically extended pillars within the subterranean formation from the heavy proppant released from the less viscous slurry;

(E) releasing the heavy proppant suspended in the more viscous slurry while the more viscous slurry is in a static state;

(F) building onto the at least two vertically extended pillars from the proppant released from the more viscous slurry;

(G) creating conductive channels within the subterranean formation between the vertically extending pillars; and (H) bracing open the fracture between the vertically extended pillars with the neutrally buoyant proppant from the more viscous and/or less viscous slurry.

16. The method of claim 15, further comprising creating a partial monolayer of proppant from the neutrally buoyant proppant in the area between the vertically extended pillars.

17. The method of claim 15, wherein the less viscous fluid is less stable than the more viscous fluid due to the presence of and/or amount of breaker, crosslinking agent, gel stabilizer, pH buffer or viscosifying agent in the less viscous fluid.

18. The method of claim 15, wherein the viscosity ratio of the more viscous slurry to the less viscous slurry is a minimum of 1.3:1.

19. The method of claim 15, wherein the difference in viscosity between the more viscous slurry and the less viscous slurry is between from 200 to 1500 cP.

20. The method of claim 15, wherein at least one of the following conditions prevail:

(a) the more viscous fluid and the less viscous fluid contain the same breaker and further wherein the amount of breaker in the less viscous fluid is more than the amount of breaker in the more viscous fluid;

(b) the more viscous fluid and the less viscous fluid contain the same gel stabilizer and further wherein the amount of gel stabilizer in the less viscous fluid is less than the amount of gel stabilizer in the more viscous fluid;

(c) the less viscous fluid is less stable than the more viscous fluid by the amount of pH buffer present in the less viscous fluid; or (d) the more viscous fluid and the less viscous fluid contain the same viscosifying agent and wherein the amount of viscosifying agent in the less viscous fluid is less than the amount of viscosifying agent in the more viscous fluid.

* * * * *